United States Patent [19]
Hecker

[11] 3,794,272
[45] Feb. 26, 1974

[54] ELECTRO-OPTICAL GUIDANCE SYSTEM

[75] Inventor: Klaus J. Hecker, Oberursel, Taunus, Germany

[73] Assignee: The United States of America as represented by the Secretary of the Navy, Washington, D.C.

[22] Filed: Feb. 13, 1967

[21] Appl. No.: 616,437

[52] U.S. Cl............ 244/3.17, 235/181, 343/5 MM, 343/100 CL
[51] Int. Cl. .................... F41g 7/00, F42b 15/02
[58] Field of Search.. 343/100.7; 235/181; 244/3.17

[56] References Cited
UNITED STATES PATENTS
| | | | |
|---|---|---|---|
| 3,747,094 | 7/1973 | Gamertsfelder | 343/5 MM |
| 3,617,724 | 11/1971 | McCarthy et al. | 235/181 |
| 3,737,120 | 6/1973 | Green | 244/3.17 |

Primary Examiner—Maynard R. Wilbur
Assistant Examiner—H. A. Birmiel
Attorney, Agent, or Firm—R. S. Sciascia; Paul S. Collignon

[57] ABSTRACT

The description involves area correlation of a scene viewed by a television (TV) camera carried by a missile toward a target seen preferably in the center of the scene. The initial scene is memorized in an electronic memory circuit of the correlator and digitally correlated with actual video signals viewed by the TV camera in the travel of the missile toward its target, this correlation providing pitch, yaw, roll, and zoom lens scale error signals to correct the missile direction and to correct the zoom lens focus as the target is approached. A reticle is projected onto the camera screen to provide reticle pulses for digital correlation as to scene segments.

7 Claims, 8 Drawing Figures

INVENTOR.
KLAUS J. HECKER

H. H. Losch
Attorney

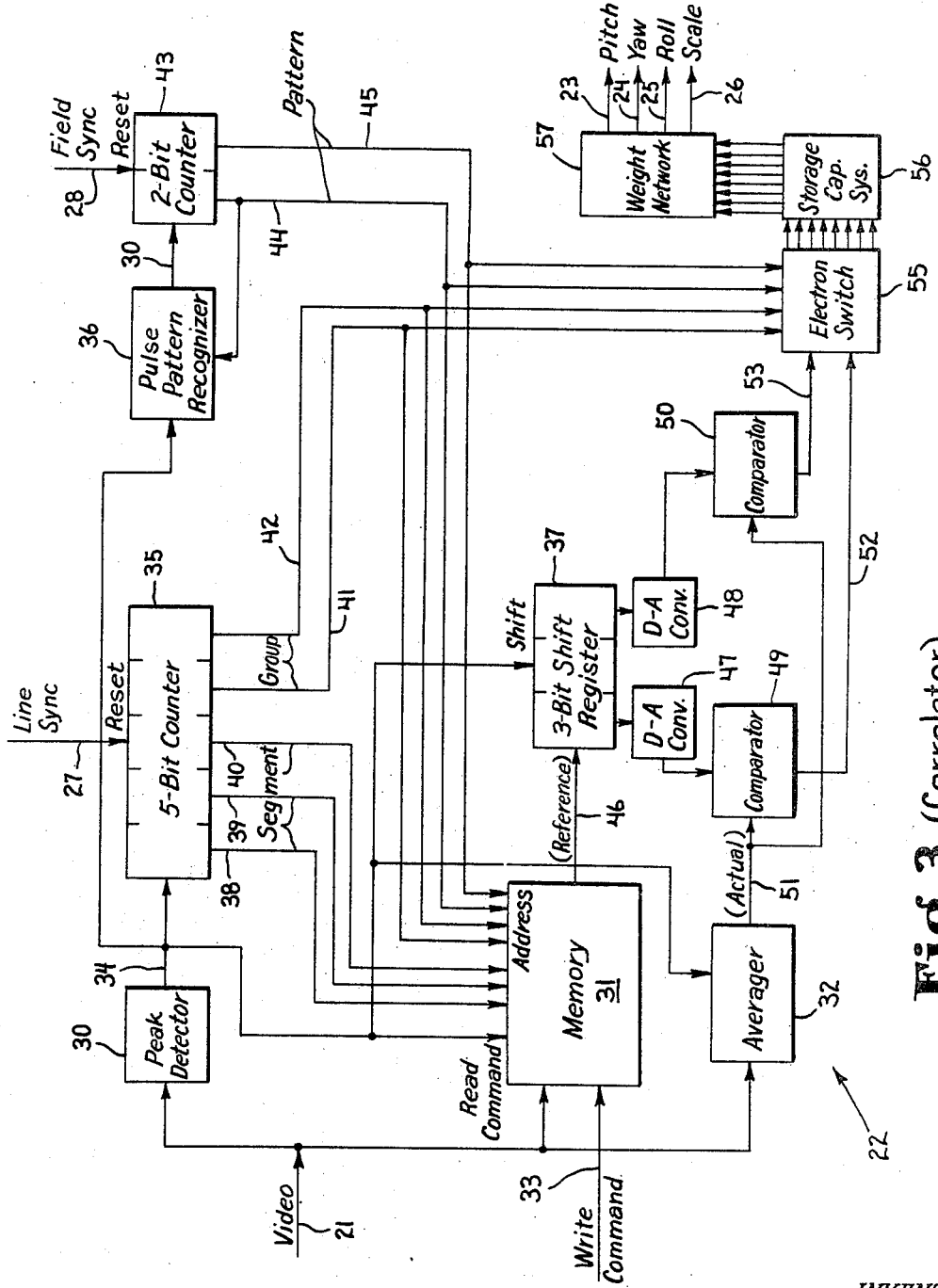
Fig. 3. (Correlator)

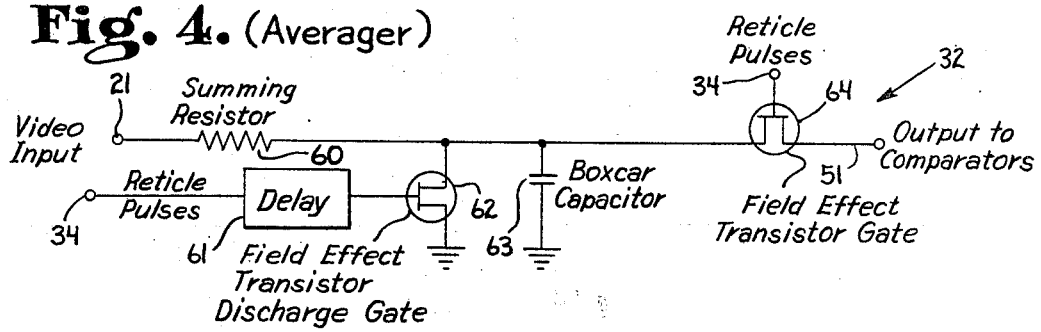
Fig. 4. (Averager)
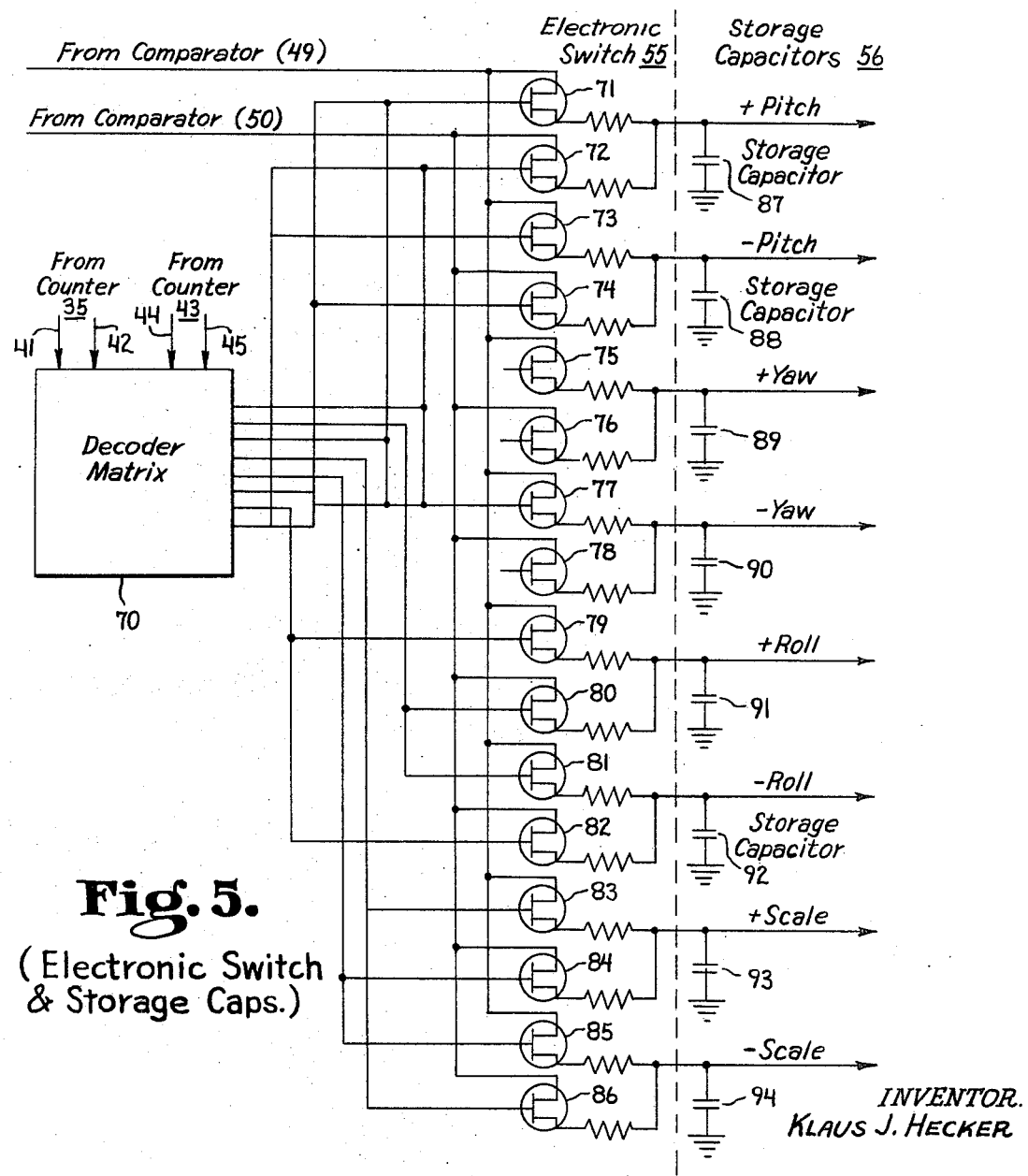
Fig. 5.
(Electronic Switch & Storage Caps.)
INVENTOR.
KLAUS J. HECKER

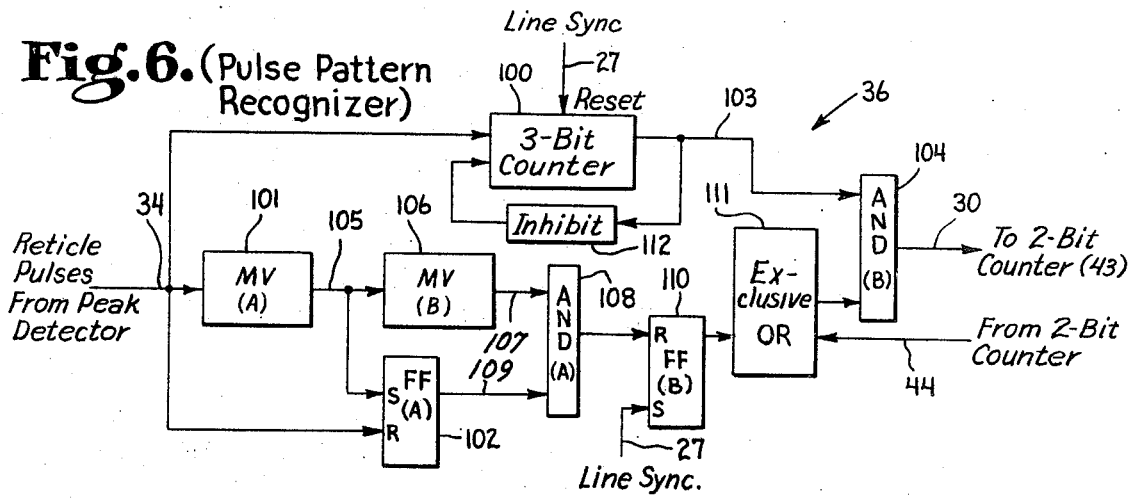
Fig. 6. (Pulse Pattern Recognizer)
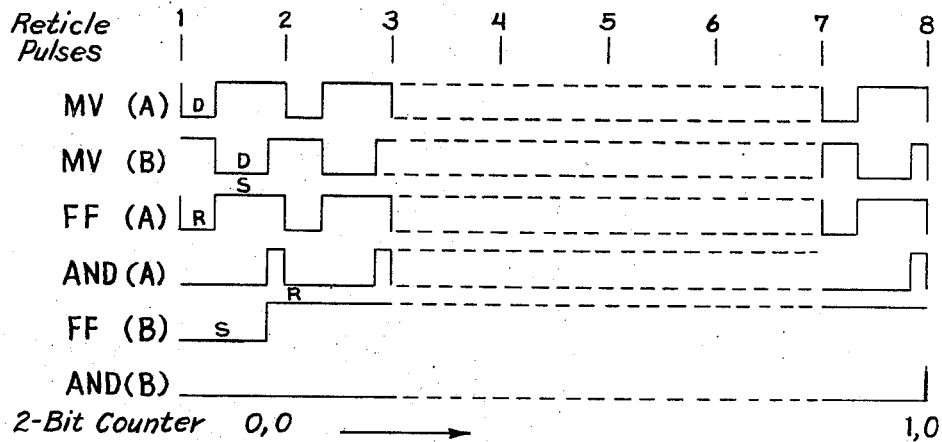
Fig. 7.
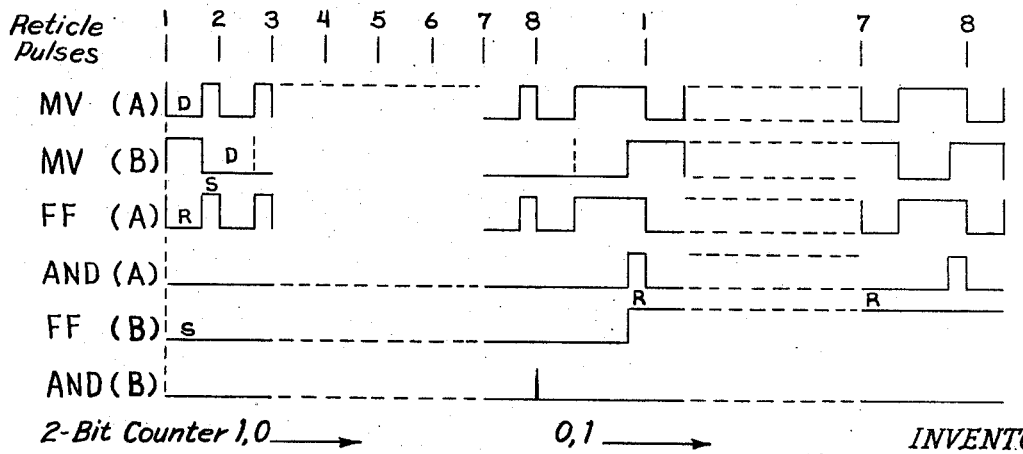
Fig. 8.
INVENTOR.
KLAUS J. HECKER
H. H. Loscke
Attorney

ELECTRO-OPTICAL GUIDANCE SYSTEM

The invention described herein may be manufactured and used by or for the Government of the United States of America for governmental purposes without the payment of any royalties thereon or therefor.

This invention relates to electro-optical guidance systems for missile guidance and more particularly to a digital means of area correlating a scene optically imaged in a TV camera tube screen along with a specifically designed reticle to obtain pitch, yaw, roll, and scale or distance error signals for guiding a missile to a target in the scene.

BACKGROUND OF THE INVENTION

Several means of target tracking by electro-optical means are known. Area correlation tracking is desirable since correlators are capable of tracking even when the target itself has little or no contrast against its background. Most correlators, however, are relatively complex and costly.

SUMMARY OF THE INVENTION

In the present invention targets are picked up in a scene viewed by a television camera onto which camera tube screen is superimposed a reticle of particularly designed segments from a gyroscopically controlled reticle projector. The camera output is coupled to a correlator to correlate the brillance of the various segments of the scene including the target with a reference memorized scene to establish digital-to-analog voltage signals compared and related to provide pitch, yaw, roll, and scale error signals. The pitch, yaw, and roll signals are used to guide the missile carrying the system to its target while the scale signals are used to adjust the zoom objective lens of the television camera to maintain the scene in proper focus. It is therefore a general object of this invention to provide an electro-optical missile guidance system utilizing a television camera to "see" a scene including a target which scene is scanned and the brillance of area segments correlated with reference brillance of the memorized scene by digital and analog voltage representations to provide analog error voltage signals in pitch, yaw, roll, and scale to direct the missile to the target area of the scene.

BRIEF DESCRIPTION OF THE DRAWINGS

These and other objects and the attendant advantages, features, and uses will become more apparent to those skilled in the art as the description proceeds when considered along with the accompanying drawings, in which:

FIG. 3 is a block circuit schematic diagram of the correlator circuit of FIG. 1 with arrows on the conductors representative of the direction of information;

FIG. 4 is a circuit schematic diagram of the averager circuit in FIG. 3;

FIG. 5 is a circuit schematic and partially block diagram of the electronic switching means of FIG. 3;

FIG. 6 is a block circuit schematic diagram of the pulse pattern recognizer in FIG. 3; and FIGS. 7 and 8 are each wave patterns of several elements in the pulse pattern recognizer circuit used to gate a predetermined reticle count to the 2-bit counter in FIG. 3.

DESCRIPTION OF THE PREFERRED EMBODIMENTS

Figure 1:
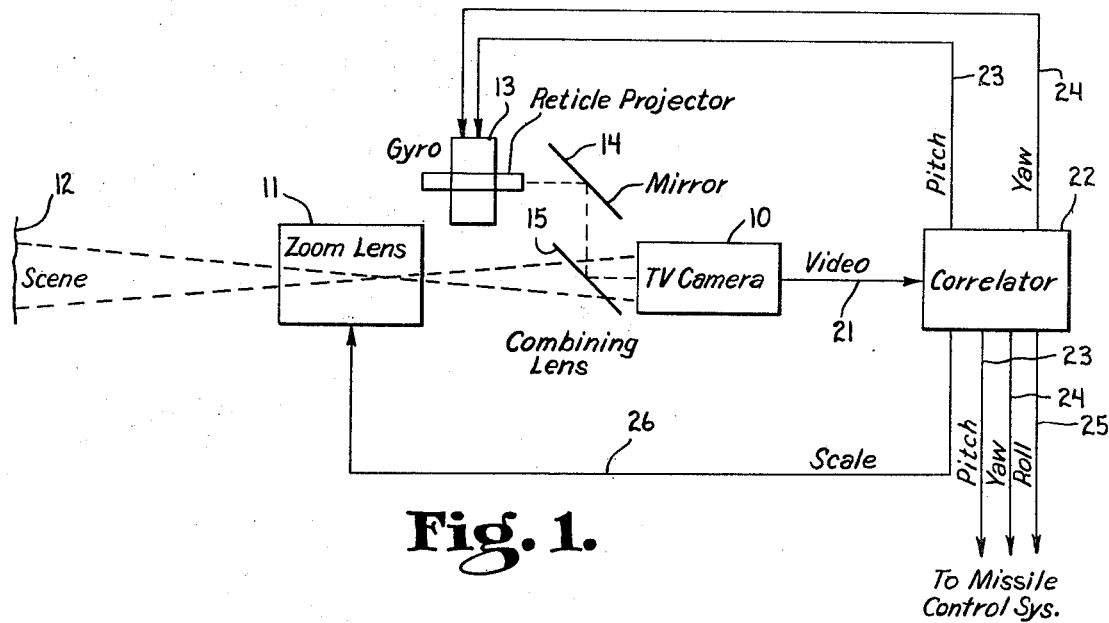
FIG. 1 is a block circuit schematic of a television camera, reticle projector, and correlator circuit for area correlation missile tracking circuits to a target in a scene.
Figure 2:
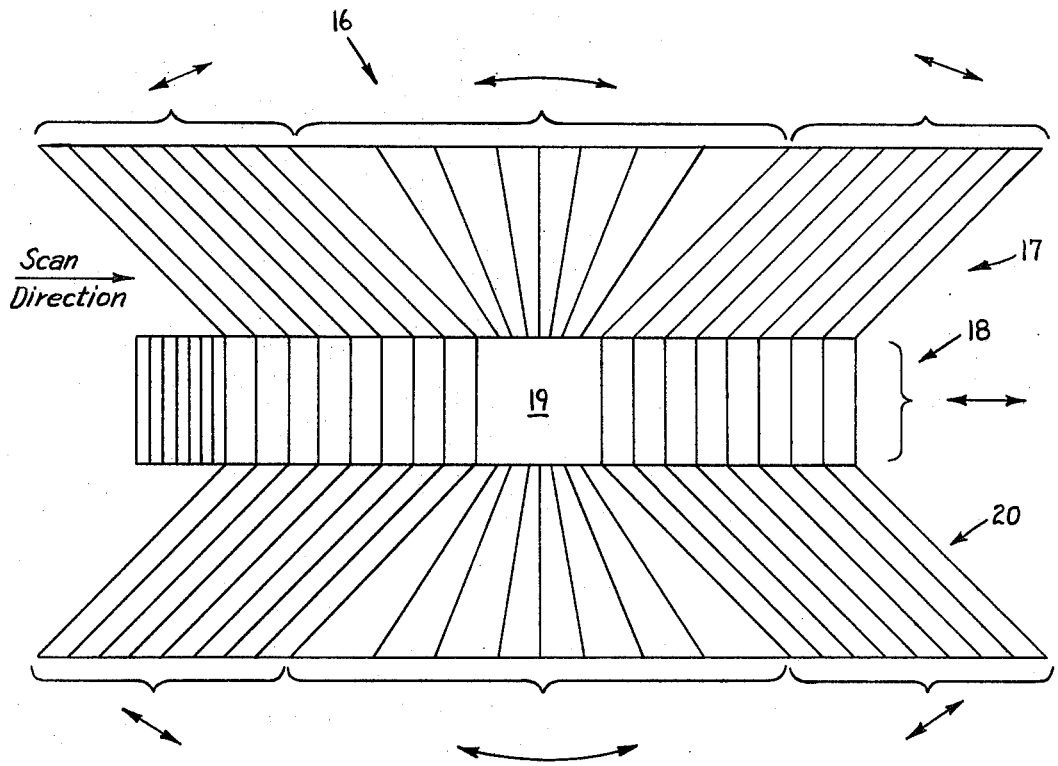
FIG. 2 is a reticle projected by the reticle projector of FIG. 1.

Referring more particularly to FIGS. 1 and 2, the missile tracking circuit of this invention utilizes a TV camera 10 having a scaled zoom lens 11 in the object path to view a scene 12 forward of the missile and a gyroscopically controlled reticle projection means 13 projecting a reticle by reflection on a mirror 14 and a half silvered mirror or combining lens 15 into the TV camera 10. The gyroscopic reticle projector 13 projects a reticle 16 as shown in detail in FIG. 2 such that the scanned direction in the TV camera 10 is across the tube face and reticle as shown by the arrow in FIG. 2. The reticle of FIG. 2 is composed of three patterns, the upper pattern 17, the central pattern 18 having a tracking center area 19 therein, and a lower pattern 20 in a juxtaposed relation, each reticle pattern being in three groups of eight reticle lines. THe video output of the TV camera 10 is by way of a conductor means 21 to a correlator circuit 22 which produces pitch, yaw, roll, and scale error voltages on the outputs thereof. The pitch and yaw error voltages are conducted by way of conductor means 23 and 24 to the gyroscope reticle projector 13 while the pitch, yaw, and roll conductors 23, 24, and 25, respectively, are coupled to the control system of the missile (not shown) to guide it in a tracking mode. The scale error voltage from the correlator on the output conductor 26 is applied to the zoom lens control circuit to maintain the scene 12 in focus on the TV camera tube 10 as the missile approaches the target in the scene. The combination shown in FIG. 1, as understood by those skilled in the art, is carried by the missile and in the tracking mode will maintain the target in the area 19 of the reticle image shown in FIG. 2 being on the longitudinal center line of the missile.

Referring more particularly to FIG. 3 where the correlator circuit 22 of FIG. 1 is shown in block circuit detail, the video output 21 of the TV camera tube 10 is applied in common to a peak detector 30, a memory circuit 31, and an averager circuit 32. The memory circuit 31 also includes a WRITE command input by way of conductor 33 from other sources of the equipment (not shown). Whenever the WRITE command signal is applied to the memory circuit, the video electrical information from the conductor 21 is applied in accordance with the address applied to this memory circuit, as soon will be described. Since the video information coming by way of conductor means 21 also include pulses produced by the scan of the TV camera tube 10 over the reticle of FIG. 2 producing greater amplitude information than the scene, the peak detector 30 will detect these reticle lines and conduct corresponding reticle pulses on its output 34. The reticle pulse output 34 from the peak detector 30 is applied to a five-bit digital counter 35, to a pulse pattern recognizer circuit 36, to the memory circuit 31 as READ command signals, to the shift control of a three-bit shift register 37, and to the averager circuit 32. The five-bit digital counter 35 is herein illustrated as having the digits to increase in sequence from the lower order to higher order, left to right, to provide outputs 38, 39, and 40 of the lower order three digits representing counts of eight from the reticle of FIG. 2. As may be noted in referring back to FIG. 2, the reticle lines are arranged in groups of eight lines, there being three groups in each of the upper, middle, and lower patterns. The last two digits of the five-bit digital counter 35 designates the group scanned by the TV camera tube beam while the first three digits over the counter 35 will designate the segment scanned. The outputs 38 through 42 from the five-bit digital counter 35 are coupled as the address inputs to the memory circuit 31, as hereinbefore mentioned. The video input at 21 applied to the memory circuit 31 under a WRITE command will retain the video information for each segment and group as the beam scans the TV camera tube. The WRITE command may be used to memorize a scene from a photograph, or the like.

The output 34 of the peak detector 30 is also coupled by the branch conductor to a pulse pattern recognizer 36 constructed and arranged, as will be described with reference to FIG. 6, to control a two-bit counter 43 through output 30 to establish on its outputs 44 and 45 digitally which of the upper, central, and lower reticle patterns is being scanned at any given time. The outputs 44 and 45 from the two-bit counter 43 are also applied as part of the address to the memory circuit 31. Accordingly, as the TV camera tube scans, the address to the memory circuit 31 it will be provided in accordance with the position of the scan beam by segment, group, and pattern for either a WRITE command or a READ command. When the system is in its tracking mode, each reticle pulse is a READ command to the memory circuit which will cause a readout on its output 46 in accordance with this address to the first bit of the three-bit shift register 37. This information applied with each reticle pulse to the register 37 will be shifted by the reticle pulse to the right to produce three adjacent bits of information as the scan of the TV camera tube continues. The output 46 from the memory circuit 31 represents reference brightness voltage signals of each segment of information of the scan of the TV camera tube over the scene 12 memorized from a picture or the like. The first and third bits of the shift register 37 have outputs coupled respectively to digital-to-analog converters 47 and 48, the outputs of each being to a comparator 49 and 50, respectively. The second input to each comparator 49 and 50 is from the averager network 32 on its output 51 representative of the actual voltage amplitude being an analog voltage of the scene brightness of the scan of the camera tube 10 as it progresses in its scan over the actual scene. The averager 32 will be more fully described in detail in the description of the next figure, but is should be understood herein that the actual scene brightness produced by the averager 32 and readout in accordance with each applied reticle pulse applied thereto corresponds to the second or central bit of the shift register 37 containing the reference brightness signals from the memory circuit 31. Accordingly, it can be seen that the average brightness signal is compared in each comparator 49 and 50 from the reference signal preceding and the reference signal in the three-bit register 37, these compared outputs being by way of conductor means 52 and 53 to an electronic switching means 55. The electronic switching means also has the conductors 41 and 42 from the five-bit counter 35 and conductors 44 and 45 from the two-bit counter 43 connected thereto to switch the information from the comparators applied over conductors 52 and 53 to a storage capacitor system 56, which electronic switch and storage capacitor system will be more fully described hereinbelow with reference to another figure. The electronic switch 55 reduces the information to eight signals, two signals consisting of positive and negative analog voltages for each of the pitch, yaw, roll, and scale information which are stored in the storage capacitor system 56. These eight bits of stored information are applied to a weight network 57 consisting of summing circuits to reduce the pitch, yaw, roll, and scale information to a single positive, negative, or null voltage signal on outputs 23, 24, 25, and 26. The synchronous pulses for line scan in the camera 10 are applied over conductor 27 to reset the five-bit counter 35 while the two-bit counter 43 is reset by field synchronous pulses applied over conductor 28.

Referring more particularly to FIG. 4, the averager circuit 32 is shown in circuit schematic as one known means of averaging in which the video input is applied from terminal 21 through a summing resistor 60 and the reticle pulses from the peak detector 30 on the branch conductor output 34 are applied to terminals 34 herein. These reticle pulses are applied through a delay circuit 61 to a field effect discharge gate transistor 62 coupled between the output side of the summing resistor 60 and ground. The output side of the summing resistor 60 is also coupled to one plate of a boxcar capacitor 63, the opposite plate of which is grounded. The output side of the summing resistor 60 is also coupled to one base of a second field effect transistor 64, the other base of which provides the output 51 of the averager circuit. The control electrode of the field effect transistor 64 is under the control of the reticle pulses applied by way of conductor 34 such that the video input is conducted through the field effect transistor gate 64 to the output from the charge on the boxcar capacitor 63 which is charged between reticle pulses and discharged after readout by the field effect transistor discharge gate 62. The actual brightness of the video signals represented by voltage amplitude, is thereby read out of the averager circuit at each reticle pulse.

Referring more particularly to FIG. 5 the electronic switch 55 and storage capacitor system 56 are shown in circuit schematic as one example of a means of accomplishing the desired switching results although other switching means may be used to accomplish these results where desirable. The outputs 41 and 42 from counter 35 and outputs 44 and 45 from counter 43 are applied to a decoder matrix 70 to produce eight outputs to control the electronic switches consisting of a plurality of field effect transistors 71 through 86 in accordance with the relationship shown between the counter inputs in TABLE I.

TABLE I

| Counter Outputs Last 2 Bits From 5-Bit Counter 35 | 2 Bits From 2-Bit Counter 43 | Reticle Section | Error Signals Produced | Electronic Switch Capacitors Connected to: | |
|---|---|---|---|---|---|
| | | | | Comparator 49 | Comparator 50 |
| 00 | 10 | Top Left | Pitch Yaw | −Pitch −Yaw | +Pitch +Yaw |
| 10 | 10 | Top Center | Roll | −Roll | +Roll |
| 01 | 10 | Top | Pitch | +Pitch | −Pitch |

| | | | | | |
|---|---|---|---|---|---|
| 00 | 01 | Right Pulse Pattern | Yaw None | −Yaw | +Yaw |
| 10 | 01 | Middle Left | Scale | +Scale | −Scale |
| 01 | 01 | Middle Right | Scale | −Scale | +Scale |
| 00 | 11 | Bottom Left | Pitch Yaw | +Pitch −Yaw | −Pitch +Yaw |
| 10 | 11 | Bottom Center | Roll | +Roll | −Roll |
| 01 | 11 | Bottom Right | Pitch Yaw | −Pitch −Yaw | +Pitch +Yaw |

The electronic switch field effect transistors are paired so that the input from comparator 49 is applied to one base of one of each pair, such as to 71, 73, 75, et cetera, to 85, and the input from comparator 50 is applied to one base electrode of each of the other field effect transistors of each pair, such as 72, 74, 76 et cetera, to 86. The other base electrode of each pair, such as 71 and 72, are coupled through resistors in common to one plate of a storage capacitor 87 to store +pitch information. The other base terminal of the field effect transistors 73 and 74, constituting a pair, are coupled through resistors in common to one plate of a storage capacitor 88 charged to −pitch information. In like manner the other base terminals of 75 and 76 are coupled to a storage capacitor 89 for +yaw information; 77 and 78 are coupled to storage capacitor 90 for −yaw information; 79 and 80 are coupled to storage capacitor 91 for +roll; 81 and 82 are coupled in common to storage capacitor 92 for −roll; 83 and 84 are coupled to storage capacitor 94 for +scale information; and 85 and 86 are coupled to storage capacitor 94 for −scale information. Accordingly, if the decoder matrix is addressed from the counters 35 and 43, the matrix outputs to the control terminals of field effect transistors 71 through 86 will be such to charge the several storage capacitors to the pitch, yaw, roll, and scale positive and negative error signals in accordance with the voltage amplitude signals coming from comparators 49 and 50. The positive and negative pitch analog voltage information stored on capacitors 87 and 88 will be added in the weight network 57 to produce an output pitch control error voltage, positive, negative, or zero as the case may be. In like manner the yaw, roll, and scale values will be produced on the outputs 24, 25, and 26. The positive and negative values of pitch, yaw, roll, and scale are produced from the comparators 49 and 50 outputs in a proper sequence established by the address from counters 35 and 43 in matrix 70.

Referring more particularly to FIG. 6, the pulse pattern recognizer 36 of FIG. 3 is shown in block circuit schematic form as one known means although other pulse pattern recognizer circuits may be used with like results. The reticle pulses from the peak detector 30 on its output 34 are applied by the branch conductor to the pulse pattern recognizer 36, these pulses being applied as one input to a three-bit counter 100, a bistable multivibrator (A) bearing the reference character 101, and to a reset terminal R in a flip-flop (A) denoted by reference character 102. The output of the three-bit counter is by way of conductor means 103 to an AND circuit (B) identified by the reference character 104, the output 30 of the AND circuit 104 being to the two-bit counter 43. The output of the multivibrator circuit (A) is by conductor means 105 to the set S terminal of flip-flop (A) circuit 102 and by branch conductor to a bistable multivibrator circuit (B) designated by the reference character 106. The output of multivibrator (B) is by way of conductor means 107 as one input to an AND circuit (A), designated by the reference character 108, and the output of flip-flop circuit (A), or 102, is by a conductor 109 to the AND circuit (A), 108. The output of the AND circuit (A), 108, is to the reset terminal R of a flip-flop circuit (B) designated by the reference character 110, the output of which is to an exclusive-OR circuit 111. The set terminal S of the flip-flop circuit (B), 110, is taken from the line synchronous signals of the TV camera picture tube 10 by way of conductor 27 which is likewise applied to the three-bit counter 100. A second input to the exclusive-OR circuit 111 is from the first digit of the two-bit counter 43 from its output conductor 44 while the output of the exclusive-OR circuit 111 is the second input to the AND circuit (B), 104. So that the three-bit counter 100 will count only up to eight in each line, the output 103 is coupled through an inhibiter circuit 112 to the input of the counter to block this counter after its eight count until after application of a line sync signal.

Referring more particularly to FIG. 7, there is shown in the top line the first eight reticle low frequency pulses as they occur. Let it be assumed, with reference to FIG. 2, that the scan of the TV camera tube over the reticle and scene on its face is in the scanning direction as shown in FIG. 2 beginning in the upper left hand corner. The first reticle pulse will trigger MV (A) which will remain in a "1" state for a delayed period of time D less than the period between reticle pulses, as shown on the MV (A) line of FIG. 7. After the delay of MV (A), MV (A) will return to its first stable state and trigger MV (B) to its unstable state to start it on its delay D, as shown in the MV (B) line of FIG. 7. At the same time FF (A) will be set at terminal S, as shown in the FF (A) line of FIG. 7. Since the delays D of MV (A) and MV (B) are together less than the period between reticle pulses, MV (B) will return to its first stable state before FF(A) is reset by the second reticle pulse applied to terminal R. AND circuit (A) as shown in the AND (A) line of FIG. 7 will, then, pass the MV (B) pulse to the reset terminal R of FF (B) placing it in a reset state which will continue until the line synchronous signal is applied by way of conductor 27. With the repetition of the reticle pulses 1 through 8 it can be seen from FIG. 7 that, when the three-bit counter 100 has counted to its limit of eight, this eighth count will pass through the AND circuit 104 since a "1" has been placed on the exclusive-OR circuit 111 from FF (B) which will produce a "1" from the exclusive-OR circuit 111 on the AND circuit (B). Since this eighth count from the three-bit counter will pass through AND circuit 104 to the two-bit counter 43, counter 43 which originally rested in its field sync reset condition of 0,0 will now progress to the 1,0 state. This places a "1" state on the conductor output 44 of the two-bit counter which is applied to the exclusive-OR circuit 111. Accordingly, all repeated scans over the remainder of the upper pattern 17 of the reticle in FIG. 2 will produce the waveforms as shown in FIG. 7 which will condition FF (B) in each line to apply a "1" state to the exclusive-OR circuit 111; however, since FF (B) and conductor 44 are each placing a "1"state on the exclusive-OR circuit, the output of this circuit to the AND (B) circuit will be zero to block any further pulses from the three-bit counter 100 to the two-bit counter 43. Also, the three-bit counter 100 is inhibited from said count following its first eight output count by its inhibit circuit 112 until reset by the line sync. Thus the two-bit counter 43 will remain in its 1,0 state throughout the scan of the pattern 17.

Referring now to FIG. 8, there is shown the first eight high frequency reticle pulses in the central pattern 18 of the reticle in FIG. 2 with the first low frequency reticle pulse following thereafter and a skip to reticle pulses 7 and 8, for simplicity. Since the bistable multivibrators (A) and (B) each have fixed delays, the multivibrator (A) will return to its stable state after each delay D but multivibrator (B), which has a delay now spanning the next successive reticle pulse, will remain in its delay or unstable state. FF (A) will remain in its reset state until MV (A) returns to its stable state to place FF (A) in a set state condition. This set state will be returned to the reset state with each reticle pulse. The AND (A) circuit, then, will not pass any pulses from MV (B) for the first eight pulses of high frequency, as shown in the central pattern 18, and FF (B) accordingly will remain in its set state. Now since the exclusive-OR circuit 111 has only a "0" state applied from the FF (B), 110, and a "1" from the two-bit counter on conductor 44, the AND circuit (B) will have a "1" applied to it from the exclusive-OR circuit 101 such that after a count of eight by the three-bit counter 100 this eighth pulse will be gated through AND circuit (B) to the two-bit counter to set this counter in the 0,1 state, as shown on the AND (B) line of FIG. 8. This occurs for the first scan line over pattern 18 and thereafter all scans over the central pattern 18 will cause no additional pulses applied to the two-bit counter 43 since the exclusive-OR circuit will remain in its 0,0 input state and a "0" output state to the AND circuit (B). The inhibit circuit 112 prevents the eighth pulse from changing the two-bit counter 43 as the scan advances over the low frequency pulses. Accordingly, the pulse recognizer circuit 36 has recognized the upper reticle pattern 17 and the central reticle pattern 18 and has set the output of the two-bit counter accordingly.

When the beam has scanned downwardly to a point where it begins a scan over the lower reticle pattern 20, the waves will be formed again as shown in FIG. 7. Since the input from two-bit counter 44 to the exclusive-OR circuit 111 is zero, the eighth count of the three-bit counter 100 will be gated through AND circuit (B) since the FF (B) circuit 110 is reset prior to this eighth count to produce a "1" on the exclusive-OR circuit 111. Accordingly, the pulse pattern recognizer 36 will recognize the lower pattern 20 to set the two-bit counter 43 to its 1,1 state at which additional line scans will be ineffective in the same manner as discussed for the upper pattern 17 with reference to FIG. 7. Each line scan will reset the three-bit counter 100 and the FF (B), 110, while each field synchronous pulse of the TV camera tube 10 will reset the two-bit counter 43 to its 0,0 state. The two-bit counter 43, then, supplies information over its outputs 44 and 45 to the memory circuit 31 address and to the electronic switch 55 designating whether the TV camera tube 10 is scanning over the upper pattern, the central pattern, or the lower pattern 17, 18, or 20, respectively, as well as the group and segment. As is heretofore stated, the first three digits of the five-bit counter 35 produces on its outputs 38, 39, and 40 the segment in which the camera tube scan is, and the outputs 41 and 42 from the last two-bits of counter 35 will designate the group of segments in which the scan is. The correlator circuit of FIG. 3 is accordingly constantly evaluating the video signal voltage amplitudes or brightness by comparing the average video signal with video signals of a segment preceding and a segment succeeding the average signal in the comparators 49 and 50 and this information is switched by the electronic switch 55 to place voltages on the storage capacitors system 56 to produce pitch, yaw, roll, and scale voltage error outputs capable of controlling the missile carrying the system of FIG. 1 to direct it at any target object in the central scanned portion 19.

OPERATION

In the operation of this device let it be assumed that the missile is launched carrying the system of FIG. 1 toward a target object which is in an area of scene 12. When the missile is launched, a target is oriented to the portion 19 in the reticle scan from a photograph or the actual scene under a WRITE command to the memory circuit 31 to memorize the video by segments of the scan on the camera tube. The missile is then placed in its tracking mode and set on its way to the target while the TV camera continues to scan producing reticle pulses to produce READ commands on the memory circuit 31 and to actuate the five-bit counter 35, the three-bit shift register 37, and the averager circuit 32. As scanning continues by the TV camera tube the comparison is made in comparators 49 and 50 switched in the electronic switching circuit 55 in the specifically related relation as shown by TABLE I to produce error voltages on the storage capacitors 87 through 94 which values are added for pitch, yaw, roll, and scale to produce the four output signals of pitch, yaw, roll, and scale to correct missile direction if it deviates from its position of longitudinal centerline alignment with the target in the portion 19 of the reticle to insure missile collision with the target. Any deviation of the tracking video signals, or average video signals, from the memorized reference signals up or down, right or left, rotating right or left, or from blur will affect the pitch, yaw, roll, or scale error signals accordingly.

While many modifications and changes may be made in the constructional details and features of this invention to accomplish a like result and function, it should be understood that I desire to be limited in the spirit of my invention only by the scope of the appended claims.

I claim:
1. An electro-optical guidance system for missiles comprising:
   a television camera pickup tube circuit having a scaled zoom lens therefor to record a scene in view and having a video output;
   a gyroscopically controlled reticle projected into said television camera pickup tube, said reticle having symmetrical upper and lower reticle lined patterns of three groups of segments juxtaposed to a central lined pattern of three different groups of segments than the pattern lines of said upper and lower patterns to produce reticle pulses on said video output;
   a correlator circuit coupled to said video output;
   said correlator circuit having a peak detector, a memory circuit, and an averager circuit coupled in common to said video output, said peak detector detecting said reticle pulses on an output thereof coupled in common a pulse pattern recognizer the output of which is connected to a two-bit counter, to said memory circuit to provide readout command signals, to a five-bit digital counter, to said averager circuit, and to a three-bit shift register coupled to receive output signals from said memory circuit, and said correlator further having means to compare the three-bit shift register output with the averager circuit output and apply the compared outputs to an electronic switching means, said electronic switching means being switched by digital address outputs of said five-bit and two-bit counters and said memory circuit being coupled to receive an address from said five-bit and two-bit counters to compare reference voltage amplitude of scene brightness from said memory circuit with actual voltage amplitude of scene brightness from said averager in said means to compare and switching said compared brightness voltage in said electronic switching means to storage means in accordance with the five-bit and two-bit digital counter address output, said storage means having means on its output to relate said stored values to produce pitch, yaw, roll, and scale error voltages for missile guidance to a target in said central pattern of the scene viewed, said scale error voltage being coupled to said scaled zoom lens to maintain scene focus.

2. An electro-optical guidance system for missiles as set forth in claim 1 wherein said means to compare the three-bit shift register output with the averager circuit output includes a comparator circuit on the output of each of the first and third bits of the three-bit shift register as one input thereto, the output of said averager circuit being in common as the second input to each comparator circuit, each comparator circuit having an output.

3. An electro-optical guidance system for missiles as set forth in claim 2 wherein said pulse pattern recognizer having an output connected to said two-bit counter also having a second input coupled to the first digit output of said two-bit counter to feed back digital information of the camera pickup tube scan in the upper, central, and lower patterns.

4. An electro-optical guidance system for missiles as set forth in claim 3 wherein said electronic switching means is constructed and arranged to switch said two comparator circuit inputs in accordance with a sequence established by said five-bit and two-bit counter outputs coupled thereto to said storage means, said storage means being comprised of capacitors to receive plus and minus pitch analog voltage, plus and minus yaw analog voltage, plus and minus roll analog voltage, and plus and minus scale analog voltage.

5. A correlator circuit for an electro-optical guidance system comprising:

an input of video signals from a camera tube of a scene of view on which tube is superimposed a reticle of like upper and lower patterns juxtaposd to an unlike central pattern, each pattern having three groups of eight reticle lines to produce video reticle pulses of greater amplitude than the scene;

a peak detector, a memory circuit, and an amplitude averager circuit coupled in common to said video input, each having outputs;

a pulse pattern recognizer circuit, a five-bit digital counter, a three-bit shift register, said averager, and a READ command input of said memory circuit being coupled in common from the output of said peak detector;

a multiple electronic switch having electrical charge storage means on the output of each switch;

a two-bit digital counter coupled to an output of said pulse pattern recognizer with the digital outputs thereof representative of the upper, lower, and central patterns of said reticle, together with the outputs of said five-bit digital counter, representative of the group in each pattern and the segment between reticle lines in each group, being coupled to the memory address of said memory circuit, said memory circuit having an output coupled to said three-bit shift register to cause each addressed segment of said scene to be shifted through said shift register in accordance with the reticle pulse count of said five-bit and two-bit digital counters, and said output of said two-bit digital counter and the last two higher order digits of said five-bit digital counter being coupled to said multiple electronic switch to switch same in accordance with the existence of the upper, lower, and central reticle patterns;

two comparators, one coupled to the output of the first digit of said three-bit register and the other comparator coupled to the output of the third of said three-bit shift register, the output of each comparator being coupled to said electronic switch, and the output of said averager circuit being coupled as a second input to each comparator to compare actual voltage amplitude of scene segments with scene segments from said memory circuit; and a weight network coupled to said electrical charge storage means in related combinations to produce analog voltage on outputs thereof to produce pitch, yaw, roll, and scale error voltages.

6. A correlator circuit for an electro-optical guidance system as set forth in claim 5 wherein said coupling from said first and third digit outputs of said three-bit shift register to said two comparators, respectively, each includes a digital-to-analog converter.

7. A correlator circuit for an electro-optical guidance system as set forth in claim 6 wherein said pulse pattern recognizer coupled to said two-bit digital counter has a feedback to said pulse pattern recognizer from the first digit output of said two-bit counter to feedback digital information of the pattern being scanned to enable said pulse pattern recognizer to recognize the next scanned pattern.

* * * * *

UNITED STATES PATENT OFFICE
CERTIFICATE OF CORRECTION

Patent No. 3,794,272  Dated February 26, 1974

Inventor(s) KLAUS J. HECKER

It is certified that error appears in the above-identified patent and that said Letters Patent are hereby corrected as shown below:

Column 3, line 62, after "signal"

INSERT

-- immediately following the actual reference signal --

Signed and sealed this 10th day of September 1974.

(SEAL)
Attest:

McCOY M. GIBSON, JR.
Attesting Officer

C. MARSHALL DANN
Commissioner of Patents